Figure 1:
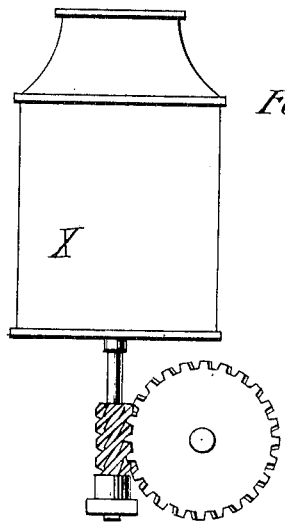

E. SCHOU.
BUTTER MANUFACTURE.
APPLICATION FILED MAY 20, 1908.

913,920. Patented Mar. 2, 1909.

Witnesses:

Inventor
Ejnar Schou.
By his Attorneys

UNITED STATES PATENT OFFICE.

EJNAR SCHOU, OF LONDON, ENGLAND.

BUTTER MANUFACTURE.

No. 913,920.　　　　Specification of Letters Patent.　　Patented March 2, 1909.

Application filed May 20, 1908. Serial No. 433,884.

*To all whom it may concern:*

Be it known that I, EJNAR SCHOU, a subject of the King of Denmark, residing at London, England, have invented certain new and useful Improvements in or Relating to Butter Manufacture, of which the following is a full, clear, and exact description.

This invention has reference to improvements in or relating to butter manufacture. Among existing processes of manufacturing butter the following is generally regarded as the best for producing an article of uniform quality. New milk as received from the farmers is treated for cream extraction by means of separators, so regulated as to yield cream containing thirty per cent. of butter fat, or thereabouts. Sometimes, but not invariably, the cream is then pasteurized by heating it to about eighty five degrees centigrade and cooling it immediately thereafter to below ten degrees centigrade. When it is desired to produce a "soured" butter the cream is generally then conveyed to "ripening" vessels, where the souring culture is added. The whole is then allowed to stand at a suitable temperature until the desired state of ripeness is reached. For the conversion into butter, the cream, whether previously soured or not, is conveyed to the churns, of which there are various constructions, and churned therein until the butter is formed. Cold water is added in the latter stages to harden the butter, the buttermilk and water being then drawn off and the butter worked, first, by appliances within the churn, and afterwards on suitable machinery, to remove remaining excess of buttermilk and water, after which it is salted ready for packing.

Now in the exercise of this invention the process of churning, as ordinarily understood is entirely dispensed with, its place being taken at a latter stage by an operation occupying a few minutes or less in duration, the improved manufacture resulting in butter of much enhanced quality.

For the better understanding of the invention I desire to explain that since, speaking generally, cream consists of an emulsion wherein the globules of butter fat are held in suspension in milk serum and similarly, since the churning operation principally comprises agitation means whereby such fat globules are agglomerated and in such agglomerated state are termed butter, it appears reasonable to suppose that cream and butter are not only merely the same substance in different physical conditions but are, subject to appropriate conditions, mutually reconvertible, their relative states being, that whereas cream may be regarded as fat globules floating in and surrounded by water or milk serum, butter may, conversely, be regarded as water or milk serum globules surrounded by fat and it is the observance of these general facts that has led to this invention.

Now for the manufacture of butter according to the present invention rich fluid cream is solidified by sudden cooling, and converted into butter by appropriate mechanical means as for example by kneading or working it between fluted rollers.

Figure 2:
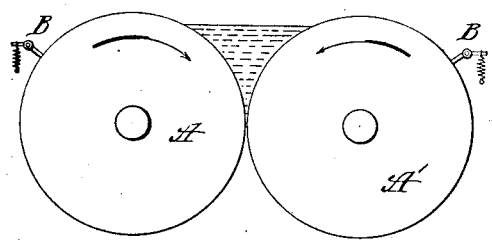
Figure 3:
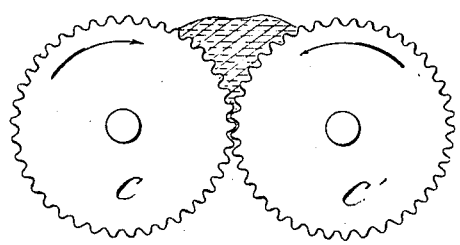

In the drawings: Figure 1 is a diagrammatic view of an ordinary cream separator used in carrying out the present invention. Fig. 2 is a diagrammatic view showing the apparatus for solidifying the cream by sudden cooling. Fig. 3 is a diagrammatic view of the apparatus for converting the solidified cream into butter.

Rich cream suitable for the purpose of this invention and containing from seventy five to eighty five per cent. or thereabouts of butter fat, the latter by preference, can be obtained by warming separated cream, previously pasteurized or not, containing thirty per cent. of butter fat, to about forty degrees centigrade or more, and passing it through a second but smaller separator X. The milk residue from such second separation contains a certain percentage of butter fat that is recovered by mixing such milk with new milk prior to its being treated in the separators.

In one example of the manufacture of butter according to this invention, rich fluid cream produced as set forth, having a butter fat content of eighty per cent. or thereabouts is, while at a temperature of forty degrees centigrade or thereabouts, mixed with any desired coloring matter, and forthwith solidified by causing it to pass between a pair of horizontally disposed hollow metallic rollers A A' adjustably arranged very near together and adapted to rotate at equal speeds, but in opposite directions toward each other, and cooled to a low temperature, by, for example, causing refrigerated brines to circulate continuously therethrough. The fluid cream, as the rollers rotate, is practically instantaneously cooled thereon into a solid layer, the exact thickness of which is determined by the distance apart of the rollers. This layer on emergence from between the rollers becomes divided into two parts, which respectively adhere to the surface of the rollers until brought into contact with a scraper B which removes the film in the form of flakes, or the like that contain all the moisture of the cream emulsion.

The temperature of the rollers, as controlled by the cooling medium, and the thickness of the layer of solidified cream to be produced, will vary according to requirement, but as a rule the lower the temperature and the thinner the layer, the better is the result. A good result is arrived at when the rollers are maintained at a temperature of about $-10°$ C. (minus ten degrees centigrade) and separated one from the other by a space not exceeding one millimeter or thereabouts, thus delivering the solid cream in flakes of about half a millimeter in thickness.

Better results are obtained when the rollers are spaced apart two thirds of a millimeter, the resulting films being one third of a millimeter in thickness, and still further when the space between the rollers is reduced to one third of a millimeter the films produced being one sixth of a millimeter in thickness. Notwithstanding the production of so thin a film, the output obtainable from the rollers is or can be the same or about the same as with thicker films since the rollers can be run at correspondingly higher speeds when producing the thinner films.

If desired the rollers can be brought within a distance apart one sixth of a millimeter or less but ordinarily this is not recommended since there is less certainty of the film dividing into two parts and being delivered from each roller equally and consequently of obtaining the maximum advantage from the two roller surfaces.

The cream flakes are worked, appropriately between fluted rollers C C$^1$ spaced apart one-eight of an inch or thereabouts, such as ordinarily employed in margarin factories and which in this case takes the place of the churn. Such working of the mass converts the chilled cream emulsion into the condition of butter or emulsion of water or milk serum globules surrounded by fat. From this mass or emulsion the water and serum can be worked out more or less largely as may be desired in the manner usual in making butter in the ordinary way.

When it is desired to produce a "soured" butter according to this invention the cream can be ripened by one or other of the following methods: 1. By effecting the ripening in the manner hereinbefore described with reference to existing processes, thus completing the ripening before chilling and solidifying the cream on the cooling surfaces—or— 2. By adding souring culture to the cream immediately prior to effecting the chilling and solidifying of the cream and, after such chilling and solidifying, allowing the mass to rest for a suitable time before being worked into butter.

Sometimes, instead of employing cream as rich as eighty per cent. of fat or thereabouts without any admixture of water as indicated in the hereinabove described example, it is advantageous to somewhat dilute with good water, preferably distilled, such cream so that it shall after addition of the souring culture contain from say sixty per cent. to sixty five per cent. of fat, the treatment generally in other respects being as described in the said example. Such diluted cream is however included in the term rich fluid cream.

Now by means of this invention there results the important advantage that churning as ordinarily understood is entirely dispensed with, and consequent thereupon the following further advantages are obtained: A. No production of buttermilk, which is frequently a comparatively useless by product. B. Saving from one half to one per cent. or more of the weight of butter produced, which ordinarily remains in the buttermilk. C. No use of water in the churn for chilling the butter with the consequence that the quota of souring culture ordinarily washed away is saved; a more uniform fermentation produced, and the natural nutty flavor of the cream conserved. D. The cooling of the cream emulsion by means of a medium considerably below freezing point and its solidification enables butter to be produced altogether superior in texture to that obtained by existing processes, the butter even when containing sixteen per cent. or more of moisture, possessing a much firmer and superior texture as compared with ordinarily prepared butter containing a smaller percentage of moisture.

Having now particularly described and ascertained the nature of the said invention what I claim and desire to secure by Letters Patent of U. S. America is:

1. The process of making butter, which consists in solidifying rich fluid cream by suddenly cooling the same, and subsequently kneading or working the solidified product.

2. The process of making butter, which consists in solidifying rich fluid cream by reducing it to a thin layer and subjecting it to the action of a medium at a temperature below freezing, and subsequently kneading or working the solidified product.

3. The process of making butter, which consists in cooling fluid cream by passing it between two cold rollers in intimate proximity to one another and rotating in opposite directions, separating the layer or film from the delivery side of the rollers in two parts that adhere thereto, removing the film in the form of flakes or the like, and finally kneading or working the solidified product.

4. The process of making butter, which consists in passing rich fluid cream between rollers cooled to about minus ten degrees centigrade and spaced apart from one millimeter to one-third of a millimeter from one another, scraping the solidified cream from the surface of the rollers, and finally kneading or working the solidified product.

In witness whereof, I subscribe my signature, in the presence of two witnesses.

EJNAR SCHOU.

Witnesses:
FLEISCHER,
C. V. SCHOU.